(12) United States Patent
McDonald et al.

(10) Patent No.: US 8,887,845 B2
(45) Date of Patent: Nov. 18, 2014

(54) STOW-AWAY AIR DAM

(75) Inventors: Stephen S. McDonald, Hartland, MI (US); Michael R. Colville, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 13/616,925

(22) Filed: Sep. 14, 2012

(65) Prior Publication Data
US 2014/0076645 A1 Mar. 20, 2014

(51) Int. Cl.
*B60K 11/08* (2006.01)

(52) U.S. Cl.
USPC ........................................ 180/68.1; 296/180.5

(58) Field of Classification Search
USPC ......... 280/5.514, 6.157; 180/68.1, 68.2, 68.3, 180/69.24; 296/180.1, 180.3, 180.5
See application file for complete search history.

(56) References Cited

U.S. PATENT DOCUMENTS

| | | | | |
|---|---|---|---|---|
| 4,119,339 A | * | 10/1978 | Heimburger | 296/180.5 |
| 4,457,558 A | * | 7/1984 | Ishikawa | 296/180.5 |
| 4,904,016 A | * | 2/1990 | Tatsumi et al. | 296/180.5 |
| 6,286,893 B1 | * | 9/2001 | Presley | 296/180.5 |
| 7,686,383 B2 | * | 3/2010 | Tortosa-Boonacker | 296/180.1 |
| 7,775,582 B2 | * | 8/2010 | Browne et al. | 296/180.1 |
| 8,292,350 B2 | * | 10/2012 | Li et al. | 296/180.1 |
| 2012/0153581 A1 | * | 6/2012 | Li | 280/5.514 |
| 2012/0330513 A1 | * | 12/2012 | Charnesky et al. | 701/48 |

* cited by examiner

*Primary Examiner* — John Walters
(74) *Attorney, Agent, or Firm* — Quinn Law Group, PLLC

(57) ABSTRACT

A system for controlling airflow through an under-hood compartment of a vehicle body includes a stow-away air dam assembly disposed on the body and configured to control the airflow between the body and a road surface from outside the vehicle to the under-hood compartment. The air dam assembly includes a retractable portion and a drive shaft configured to shift the retractable portion between a stowed position and a deployed position. The retractable portion is set at a first height in the stowed position and at a second height in the deployed position, wherein the first height is greater than the second height relative to the road surface. The air dam assembly also includes an actuator configured to operate the driveshaft. The system additionally includes a controller configured to regulate the actuator. A vehicle employing the system is also disclosed.

17 Claims, 3 Drawing Sheets

US 8,887,845 B2

STOW-AWAY AIR DAM

TECHNICAL FIELD

The invention relates to a stow-away air dam for a motor vehicle.

BACKGROUND

Among various other uses, motor vehicles frequently employ ambient airflow for cooling powertrain components situated in an under-hood compartment. Ambient airflow typically enters the under-hood compartment through a grille opening strategically positioned in a high pressure area on the vehicle body or from underneath the vehicle body.

A motor vehicle may also employ a front spoiler or air dam to control the amount of ambient airflow thus entering the under-hood compartment. Such an air dam may also be employed to control flow of air relative to the vehicle at speed to enhance vehicle dynamics and handling, as well as improve drag coefficient of the vehicle body, or generate down-force thereon.

Such an air dam is typically positioned under or integrated with the vehicle's front bumper. In order for an air dam to perform its function, however, the subject air dam may be positioned sufficiently low for some obstacles and obstructions found on road ways to interfere with the air dam and cause damage thereto.

SUMMARY

A system for controlling airflow through an under-hood compartment of a vehicle body includes a stow-away air dam assembly configured to control an airflow between the body and a road surface from outside the vehicle to the under-hood compartment. The air dam assembly includes a retractable portion and a drive shaft configured to shift the retractable portion between a stowed position and a deployed or extended position. The retractable portion is set at a first height in the stowed position and at a second height in the deployed position, wherein the first height is greater than the second height relative to the road surface. The air dam assembly also includes an actuator configured to operate the driveshaft. The system additionally includes a controller configured to regulate the actuator.

The retractable portion may include a plurality of retractable components. The plurality of retractable components may include a first retractable component, a second retractable component, and a third retractable component. In such a case, each of the first and third retractable components includes a curved surface configured to at least in part wrap around the first end of the body, and the second retractable component is disposed between the first and third retractable components.

Each of the plurality of retractable components may include an arm configured to accept the drive shaft, for example via an eyelet. Each arm may include a mechanism, for example a set screw, configured to fix the driveshaft relative to the respective arm.

The drive shaft may be configured from a material that is resistant in torsion but flexible in bending, such as fiberglass.

The system may also include an actuator rod operatively connected to the actuator. The actuator rod may include at least two rod components configured to telescope relative to each other and a spring member positioned between the at least two rod components. The spring member may be configured to preload the at least two rod components relative to one another.

The under-hood compartment may house an internal combustion engine and a heat exchanger. The engine may be cooled by a fluid circulating through the heat exchanger. The stow-away air dam assembly may direct the airflow such that the airflow is passed through the heat exchanger to cool the fluid after the fluid is passed through the engine.

The controller may be configured to direct the airflow through the heat exchanger according to a load on the engine via regulating the actuator. The system may additionally include a fixed air dam configured to substantially shield the stow-away air dam assembly from the airflow when the retractable portion is in a stowed position.

A vehicle employing the above-described system is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
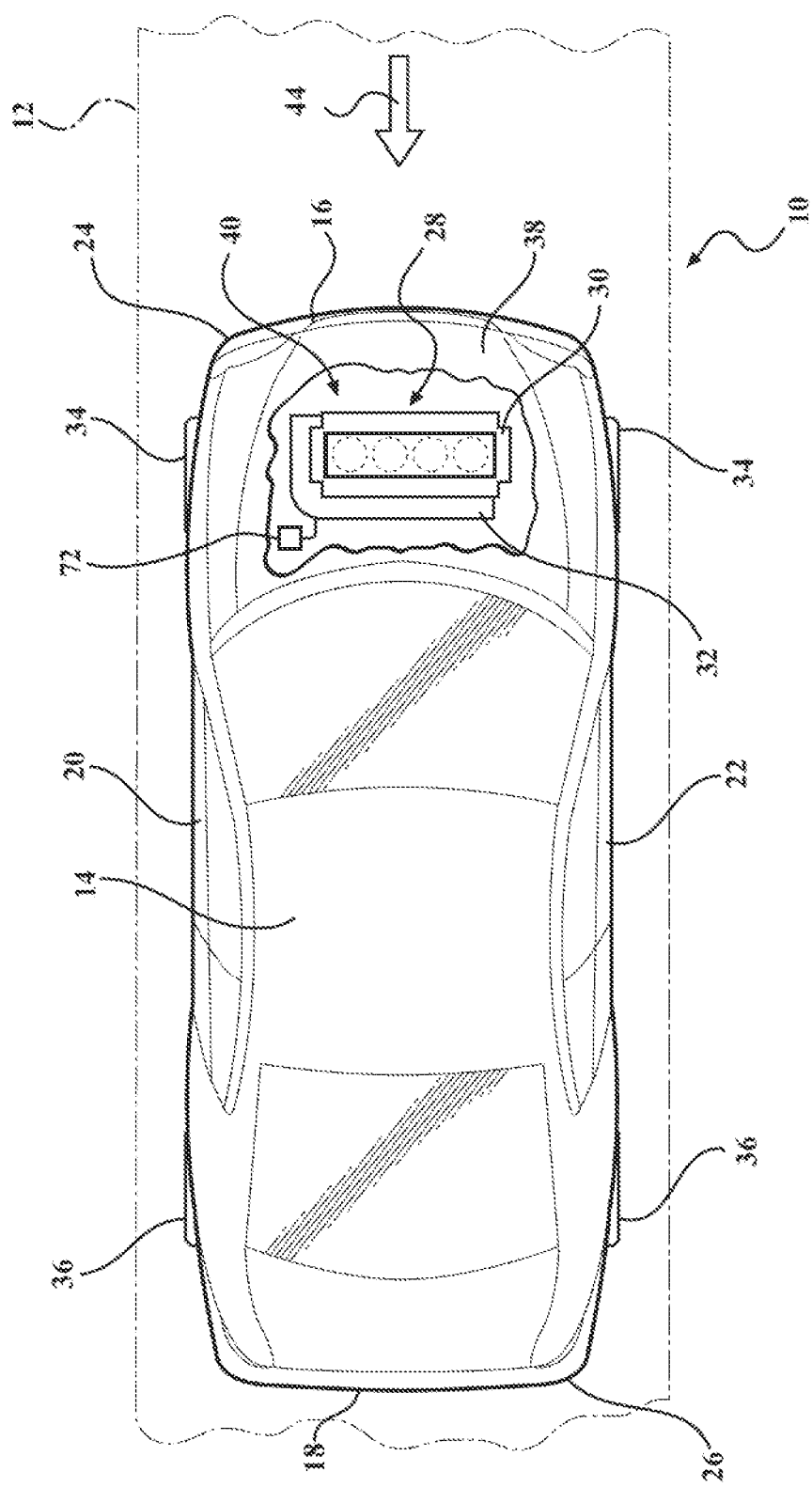
FIG. 1 is a schematic top view of a vehicle including a stow-away air dam assembly disposed at an entrance to an under-hood compartment.

Referring to the drawings, wherein like reference numbers refer to like components, FIG. 1 shows a schematic view of a motor vehicle 10 positioned relative to a road surface 12. The vehicle includes a vehicle body 14. The vehicle body 14 defines four body sides. The four body sides include a first or front end 16, a second or rear end 18, a left side 20, and a right side 22. As shown, the front end 16 may include a bumper assembly 24, while the rear end 18 may include a bumper assembly 26.

The vehicle 10 also includes a powertrain 28 configured to propel the vehicle. As shown in FIG. 1, the powertrain 28 may include an internal combustion (IC) engine 30 and a transmission 32. The powertrain 28 may also include one or more motor/generators as well as a fuel cell, neither of which are shown, but a powertrain configuration employing such devices is appreciated by those skilled in the art. The vehicle 10 also includes a plurality of wheels 34 and 36. Depending on specific configuration of the powertrain 28, power of the engine 30 may be transmitted to the road surface 12 through the wheels 34, the wheels 36, or through all the wheels 34 and 36.

Figure 4:
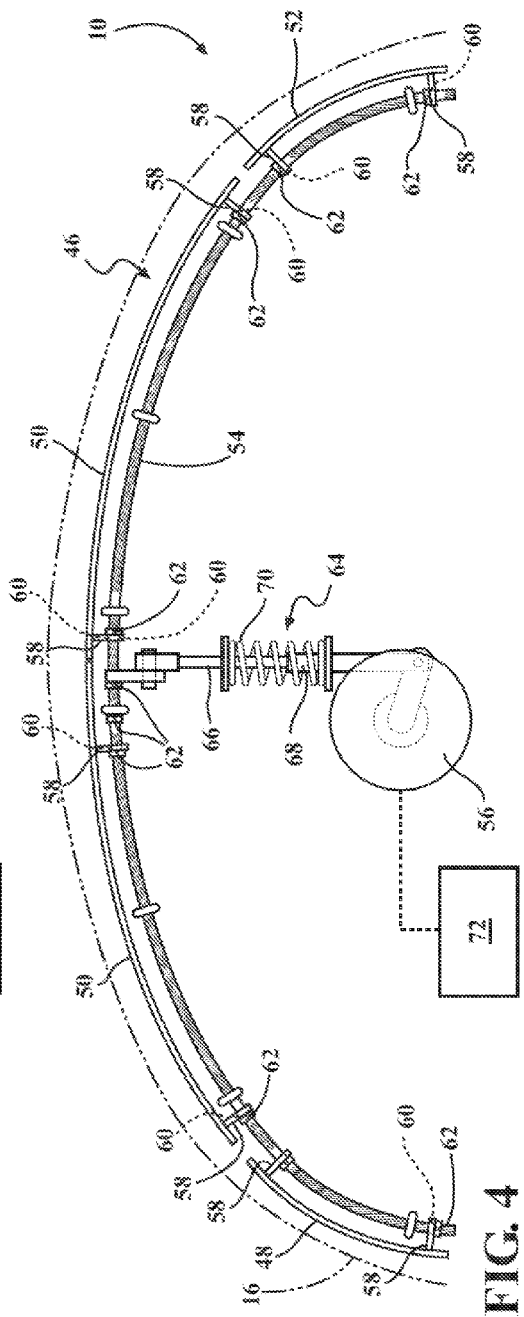
FIG. 4 is a schematic top view of the stow-away air dam assembly shown in FIG. 1, with the assembly depicted in the deployed position.
Figure 3:
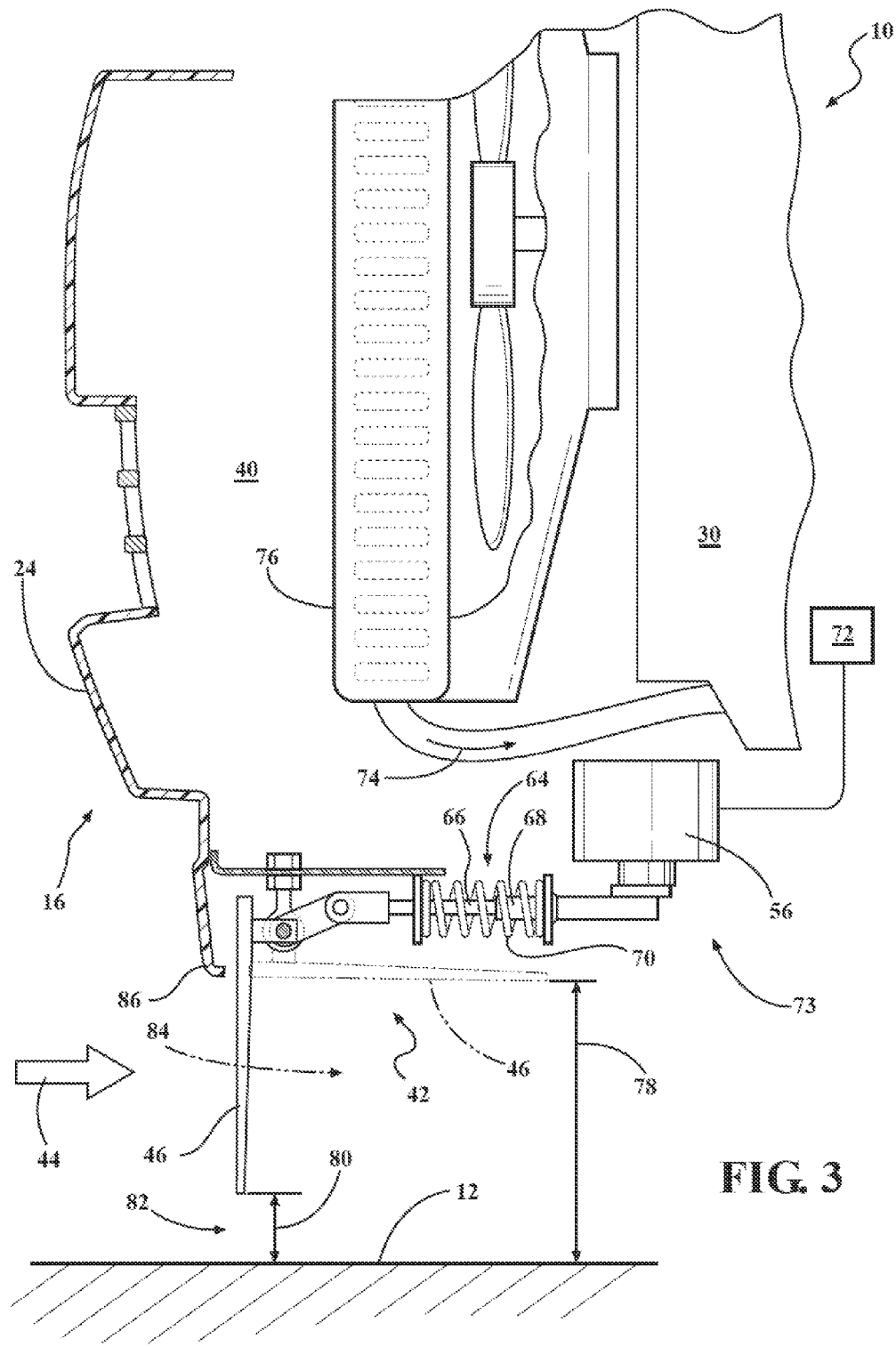
FIG. 3 is a schematic side view of the vehicle shown in FIG. 1, with the stow-away air dam assembly depicted in a deployed position.

As also shown in FIG. 1, the vehicle body 14 includes a hood 38 configured to cover a portion of the front end 16 of the body to thereby define an under-hood compartment 40. As shown in FIGS. 3-4, a stow-away air dam assembly 42 is disposed at the front end 16 and configured to control an airflow 44 from outside the vehicle, i.e., the ambient, to the under-hood compartment 40 in order to provide cooling for the powertrain 28. As shown in FIGS. 3, the air dam assembly 42 is positioned beneath the bumper assembly 24, such that the air dam assembly may be selectively extended or deployed into the path of the airflow 44 and retracted or stowed out of the way of the airflow 44. Accordingly, the air dam assembly 42 is configured to selectively regulate the stream of the airflow 44 between the front end 16 of the body and the road surface 12 en route to the under-hood compartment 40.

Figure 2:
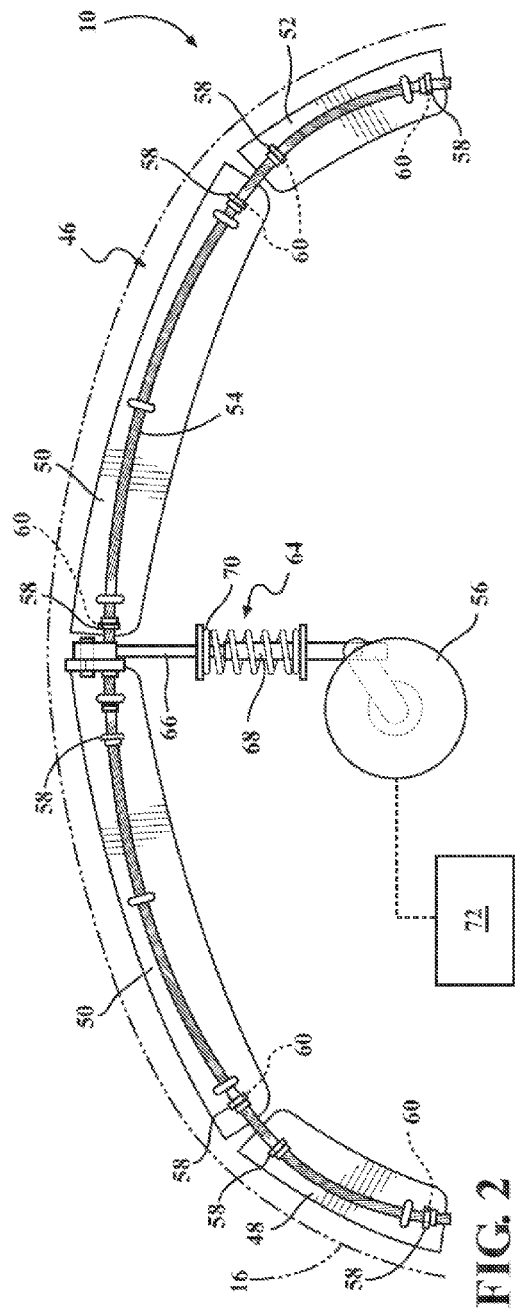
FIG. 2 is a schematic top view of the stow-away air dam assembly shown in FIG. 1, with the assembly depicted in a stowed position.

The air dam assembly 42 includes a retractable portion 46. The retractable portion 46 includes a plurality of retractable components which is shown in FIGS. 2 and 4 as a first retractable component 48, a second retractable component 50, and a third retractable component 52. Although three distinct retractable components are shown, any number of such components may be employed to form the retractable portion 46. Additionally, the second retractable component 50 may be composed of a plurality of separate portions. For example, as shown in FIGS. 2 and 4, the second retractable component 50 may be composed of two portions. Each of the first and third retractable components 48, 52 includes a curved surface configured to at least in part wrap around the front end 16 of the body 14. The second retractable component 50 is disposed between the first and third retractable components 48, 52. Additionally, the second retractable component 50 may have a substantially straight or curved surface shape, whichever is deemed to more appropriately follow the contour of the front end 16.

With continued reference to FIGS. 2 and 4, the air dam assembly 42 also includes a drive shaft 54 configured to shift the retractable portion 46 between the stowed position and the deployed position. Additionally, the air dam assembly 42 includes an actuator 56 configured to operate the driveshaft 54. The actuator 56 may be an electric motor that imparts drive torque to the drive shaft 54, wherein the drive shaft 54 in turn shifts the retractable portion 46. The drive shaft 54 may be configured from a resilient material that is resistant in torsion but flexible in bending. As such, the drive shaft 54 may be configured as a torque-type cable, i.e., a cable that is configured to accept torsional loads without significant twist, to thereby transmit drive from the actuator 56 to the retractable portion 46. Such a torque-type cable may be produced from any suitable material, such as fiberglass, or a specifically designed matrix of materials, such as a flat-wrap or a multi-strand cable conduit.

With continued reference to FIG. 2, each of the plurality of retractable components, i.e., the first, second, and third retractable components 48, 50, 52, includes at least one arm 58. Each arm 58 includes an eyelet 60 that is configured to accept the drive shaft 54. Additionally, each arm 58 includes a locking mechanism 62, such as a set screw shown in FIG. 2 or a cotter pin, configured to fix the driveshaft 54 relative to the respective arm.

The air dam assembly 42 also includes an actuator rod 64 operatively connected to the actuator 56. The actuator rod 64 may be a unitary element or, as shown in FIGS. 2-4, include a plurality of rod components, herein shown as two distinct rod components 66 and 68. The rod components 66 and 68 are configured to telescope relative to each other and have a spring member 70 positioned therebetween. As shown, the spring member 70 is configured to preload the two rod components 66 and 68 relative to one another and permit the rod component 66 to nest inside the rod component 68 under axial load, such as during impact on the retractable portion 46. Alternately, actuator rod 64 may be configured such that under load the rod component 68 will nest inside the rod component 66. The above-described telescoping construction of the actuator rod is intended to minimize the possibility of damage to the air dam assembly 42 due to impact from various obstructions, such as parking blocks, that may be encountered by the vehicle 10.

As shown in FIGS. 1 and 3, the vehicle 10 may additionally include a controller 72. Together, as shown in FIG. 3, the controller 72 and the air dam assembly 42 may form a system 73 employed for controlling the airflow 44 through the under-hood compartment 40. The controller 72 may be a stand-alone unit programmed to regulate the actuator 56. The controller 72 may also be an electronic control unit (ECU) programmed to coordinate operation of the powertrain 28 with the operation of the actuator 56. Accordingly the controller 72 may regulate the IC engine 30, which is cooled by a fluid 74. The fluid 74 is in turn circulated through a heat exchanger 76 that is housed in the under-hood compartment 40, as shown. The airflow 44 controlled by the air dam assembly 42 is then passed through the heat exchanger 76 to cool the fluid 74 after the fluid is passed through the IC engine 30. Therefore, the controller 72 may regulate the actuator 56 according to a load on the IC engine 30 to remove heat from the fluid 74 and provide the requisite engine cooling.

During operation of the air dam assembly 42, the actuator 56 generates drive torque to rotate the first, second, and third retractable components 48, 50, 52, via the drive shaft 54 acting through the respective arms 58 to and anywhere in between the stowed and the deployed positions. As shown in FIG. 3, when the retractable portion 46 is moved to the stowed position, the retractable portion is set at a first height 78 relative to the road surface 12, while when the retractable portion is moved to the deployed position, the retractable portion is set at a second height 80. As shown in FIG. 3, the first height 78 is greater than the second height 80. As a result, a smaller opening 82 is generated between the front end 16 and the road surface 12 when the retractable portion 46 is deployed in comparison to an opening 84 that is generated when the retractable portion is stowed.

The first height 78 of the retractable portion 46 is intended to reduce the likelihood of damage to the air dam assembly 42 due to impact from various obstructions frequently encountered on roadways. As shown in FIG. 3, the vehicle 10 may also include a fixed air dam 86 configured to substantially conceal the air dam assembly 42 from the airflow 44 and shield the retractable portion 46 from road debris when the retractable portion is at the first height 78 in the stowed position.

Generally, openings that are located at the front of a vehicle, such as the gap between the extendable portion 46 and the road surface 12, as well as various protruding features on the surface of the vehicle body, tend to disturb the flow of air around the vehicle body 14 and degrade the vehicle's aerodynamic signature. Accordingly, the controller 72 may be programmed to coordinate operation of the air dam assembly 42 with the operation of the powertrain 28 in order to provide appropriate cooling for the powertrain along with an optimized aerodynamic signature for the vehicle 10 during particular vehicle operation. Specifically, when the retractable portion 46 is at the first height 78 in the stowed position, the aerodynamic signature of the vehicle 10 is improved, but the powertrain cooling is reduced, while when the retractable portion is at the second height 80 in the deployed position, the reverse is true.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
   a vehicle body having a first end and a second end;
   a hood configured to cover a portion of the first end of the body to thereby define an under-hood compartment; and
   a stow-away air dam assembly disposed at the first end of the body and configured to control an airflow between the body and a road surface from outside the vehicle to the under-hood compartment, the air dam assembly including:
      a retractable portion having a plurality of retractable components;
      a drive shaft directly connected to each of the plurality of retractable components and configured to shift the retractable portion between a stowed position and a deployed position such that the retractable portion is set at a first height at the stowed position and at a second height at the deployed position, wherein the first height is greater than the second height relative to the road surface; and
      an actuator configured to operate the driveshaft.

2. The vehicle of claim 1, wherein the plurality of retractable components includes a first retractable component, a second retractable component, and a third retractable component, and wherein each of the first and third retractable components includes a curved surface configured to at least in part wrap around the first end of the body, and the second retractable component is disposed between the first and third retractable components.

3. The vehicle of claim 1, wherein each of the plurality of retractable components includes an arm configured to accept the drive shaft, and each arm includes a mechanism configured to fix the driveshaft relative to the respective arm.

4. The vehicle of claim 1, wherein the drive shaft is configured from a resilient material that is resistant in torsion but flexible in bending.

5. The vehicle of claim 1, further comprising an actuator rod operatively connected to the actuator, wherein the actuator rod includes a plurality of rod components configured to telescope relative to each other and a spring member configured to preload the plurality of rod components relative to one another.

6. The vehicle of claim 1, further comprising a controller configured to regulate the actuator.

7. The vehicle of claim 6, wherein:
   the under-hood compartment houses an internal combustion engine and a heat exchanger;
   the engine is cooled by a fluid circulating through the heat exchanger; and
   the stow-away air dam assembly directs the airflow such that the airflow is passed through the heat exchanger to modulate cooling the fluid after the fluid is passed through the engine.

8. The vehicle of claim 7, wherein the controller is configured to direct the airflow through the heat exchanger according to a load on the engine via regulating the actuator.

9. The vehicle of claim 1, further comprising a fixed air dam configured to substantially shield the stow-away air dam assembly from the airflow when the retractable portion is in a stowed position.

10. A system for controlling airflow through an under-hood compartment of a vehicle body, the system comprising:
    a stow-away air dam assembly configured to control an airflow between the vehicle body and a road surface from outside the vehicle to the under-hood compartment, the air dam assembly including:
       a retractable portion having a plurality of retractable components;
       a drive shaft directly connected to each of the plurality of retractable components and configured to shift the retractable portion between a stowed position such that the retractable portion is defined by a first height, and a deployed position such that the retractable portion is defined by a second height, wherein the first height is greater than the second height relative to a road surface; and
       an actuator configured to operate the driveshaft; and
    a controller configured to regulate the actuator.

11. The system of claim 10, wherein the plurality of retractable components includes a first retractable component, a second retractable component, and a third retractable component, and wherein each of the first and third retractable components includes a curved surface configured to at least in part wrap around the first end of the body, and the second retractable component is disposed between the first and third retractable components.

12. The system of claim 10, wherein each of the plurality of retractable components includes an arm configured to accept the drive shaft, and each arm includes a mechanism configured to fix the driveshaft relative to the respective arm.

13. The system of claim 10, wherein the drive shaft is configured from a resilient material that is resistant in torsion but flexible in bending.

14. The system of claim 10, further comprising an actuator rod operatively connected to the actuator, wherein the actuator rod includes a plurality of rod components configured to telescope relative to each other and a spring member configured to preload the plurality of rod components relative to one another.

15. The system of claim 10, wherein:
    the under-hood compartment houses an internal combustion engine and a heat exchanger;
    the engine is cooled by a fluid circulating through the heat exchanger; and
    the stow-away air dam assembly directs the airflow such that the airflow is passed through the heat exchanger to modulate cooling the fluid after the fluid is passed through the engine.

16. The system of claim 15, wherein the controller is configured to direct the airflow through the heat exchanger according to a load on the engine via regulating the actuator.

17. The system of claim 10, further comprising a fixed air dam configured to substantially shield the stow-away air dam assembly from the airflow when the retractable portion is in a stowed position.

* * * * *